Patented Sept. 21, 1948

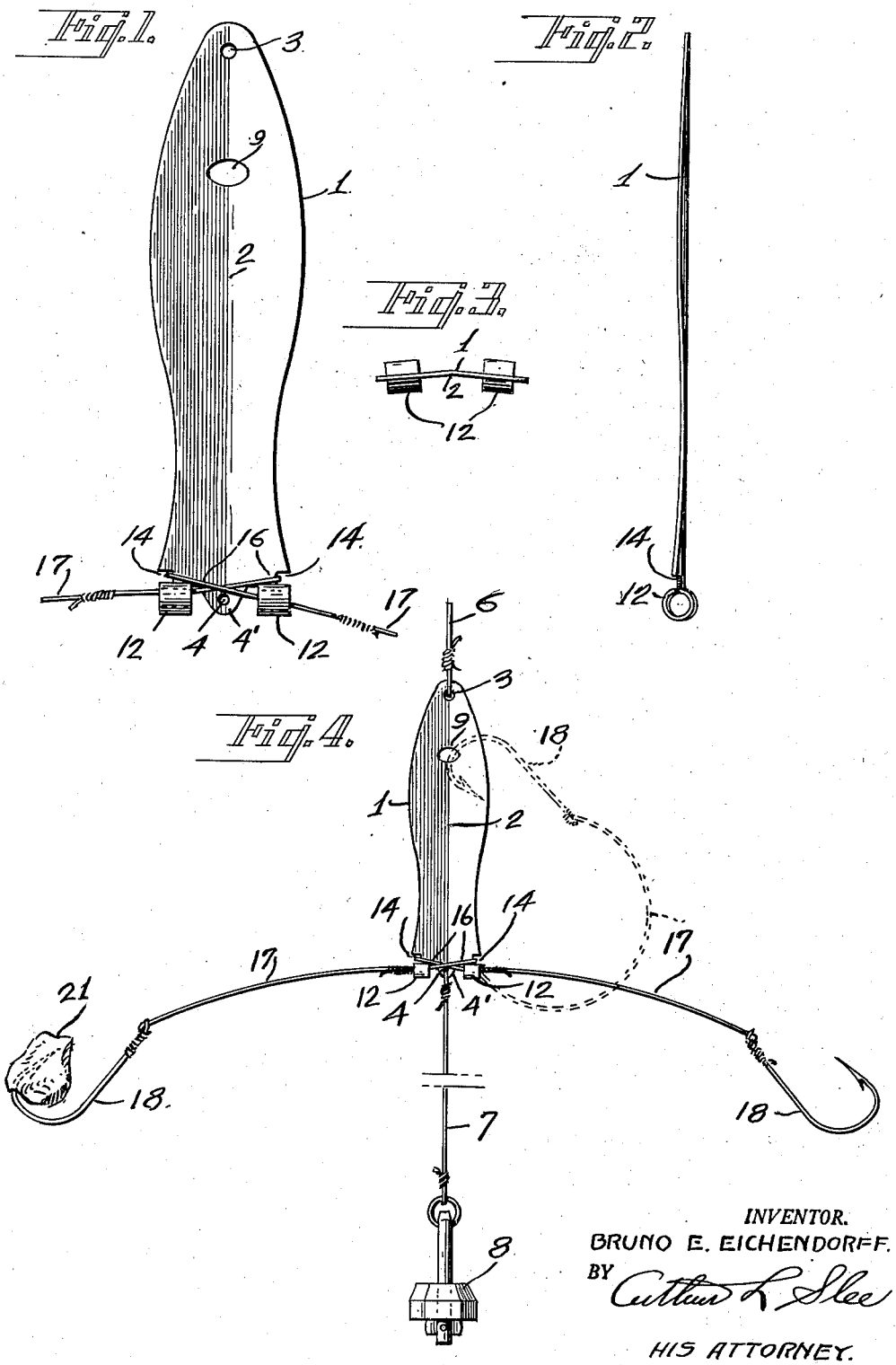

2,449,692

UNITED STATES PATENT OFFICE 2,449,692

SPOON LEADER

Bruno E. Eichendorff, San Francisco, Calif.

Application February 26, 1946, Serial No. 650,235

2 Claims. (Cl. 43—28)

The present invention relates to improvements in a leader for fishing-tackle wherein a polished, elongated plate or spoon operates in conjunction with lateral tubular members on the lower end thereof to hold baited fish-hooks substantially horizontal and laterally on opposite sides of a fishing-line and sinker and to prevent inadvertent or accidental removal of said hooks.

The primary object of the present invention is to provide a new and improved spoon leader for fishing-tackle arranged to hold fishing-hooks in substantially the same horizontal plane and apart or in spaced relation laterally to a fishing-line to which they are attached.

Another object is to provide a new and improved device of the type described having improved means for supporting baited fish-hooks in a detachable manner which will prevent inadvertent removal or loss of said hooks from a fishing line.

A further object is to provide a new and improved device of the character set forth having greatly simplified means for effectively and substantially hooding the points and barbs of fishing-hooks attached thereto while stored in a fishing-tackle kit, to prevent damage to said points and barbs as well as to prevent said points from injuring hands or fingers of a fisherman.

The invention consists of the improved device disclosed in the drawings forming a part of the present application, and in which—

Fig. 1 is a front elevation of my improved spoon leader, disclosing a preferred form of attaching the loops of fishing-hook leaders;

Fig. 2 is a side elevation thereof;

Fig. 3 is a top plan view; and

Fig. 4 is a view disclosing the device in use.

Referring to the drawings:

The numeral 1 is used to designate in general an elongated polished metal plate slightly bent longitudinally along a median line or axis as at 2 to provide a greater number of reflective planes or faces to attract or lure fish to the bait. The plate 1 is apertured at top and bottom with apertures 3 and 4, respectively, to facilitate attachment of a main fishing-line 6 and a line 7 to a suitable sinker 8, as fully disclosed in Fig. 4 of the drawings. The plate 1 is also provided with an aperture 9 intermediate the ends thereof, the purpose of which will hereinafter be more fully set forth.

The top end of the spoon leader 1 may be rounded or streamlined but the bottom end is preferably squared and provided with tubular members 12 arranged laterally and in spaced relation to each other and notches 14 are formed in opposite edges of said plate or spoon 1 and immediately adjacent the laterally positioned tubular members 12.

In operation. the loop 16 of the gut leader 17 of either fish-hook 18 is inserted through one of the lateral tubular members 12 from the outer end thereof and cast over and around the opposite tubular member 12 and with the end of said loop fully receded into the notch 14 adjacent thereto. The loop 16 of the second hook 18 is similarly inserted from the outer end of the opposite tubular member 12 and the first-placed hook is then threaded through said loop, said loop being passed back over the leader 17 of said first placed hook 18 and then cast over and around the tubular member 12 first entered by said first-placed loop and with the end of said loop fully receded into the adjacent notch 14.

The line 7 of the sinker 8 is next attached to the aperture 4 in the ear or lug 4', which lug 4' is now firmly set or extended through both loops 16, from which it is obvious that inadvertent or accidental loss of either hook from the spoon leader is practically prevented.

When the tackle as above described is lowered or cast into the water, not shown, and sustained substantially vertically as shown in Fig. 4 of the drawings, action of the tide or local currents will tend to move the spoon leader or plate 1 with its reflective faces to attract fish to the bait 21 on the hooks 18, which hooks are held, by the rigidity of their gut leaders 17, substantially horizontally within the same plane, apart from the main fishing line 6 and apart from each other, so that fish investigating one bait 21 will not be frightened or deterred by another fish interested in the opposite bait.

When stored within a fishing-tackle kit, not shown, the barbs and points of the hooks 18 may be substantially hooded and thereby protected by bending their gut leaders 17, after giving said leader a slight twist to provide torsion, until the hooks 18 may be hooked into the intermediate aperture 9 of the plate or leader 1. The torsion of the gut leaders 17 will then firmly hold the points and barbs of the hooks 18 fairly against either face of the spoon leader 1 to prevent damage to or from the said points, as disclosed in dotted lines in Fig. 4 of the drawings.

Having described my invention, I claim:

1. A spoon leader comprising an elongated polished plate apertured at both ends and bent along a median line longitudinally to form reflective faces and having lateral tubular members formed therefrom on opposite sides of one end of said plate and also having notches in opposite edges of said plate and immediately adjacent said tubular members.

2. A spoon leader comprising an elongated polished plate bent along a median line longitudinally to form additional reflective faces and apertured at both ends and also intermediate said ends and having lateral tubular members formed therefrom in spaced relation and at opposite sides of one end and also having notches formed in opposite edges of said plate immediately adjacent said tubular members.

BRUNO E. EICHENDORFF.

REFERENCES CITED

The following references are of record in the file of this patent:

UNITED STATES PATENTS

| Number | Name | Date |
|---|---|---|
| 2,088,775 | Davenport | Aug. 3, 1937 |
| 2,157,477 | Bulow | May 9, 1939 |